United States Patent [19]

Wikstroem

[11] Patent Number: 5,330,776
[45] Date of Patent: Jul. 19, 1994

[54] METHOD AND APPARATUS FOR PREPARATION OF ROLLED PRODUCTS

[75] Inventor: John I. G. Wikstroem, Bjuv, Sweden
[73] Assignee: Nestec S.A., Vevey, Switzerland
[21] Appl. No.: 929,703
[22] Filed: Aug. 12, 1992

[30] Foreign Application Priority Data

Sep. 2, 1991 [EP] European Pat. Off. ........ 91114713.0

[51] Int. Cl.⁵ .................................................. A21C 3/06
[52] U.S. Cl. .................................... 426/500; 198/839; 264/339; 425/332; 425/333; 425/363; 426/502
[58] Field of Search ............... 264/339; 425/320, 323, 425/332, 333, 363, 391; 426/500, 502, 512; 198/826, 839

[56] References Cited

U.S. PATENT DOCUMENTS

| | | | |
|---|---|---|---|
| 983,669 | 2/1911 | Beier | 198/839 |
| 1,552,430 | 9/1925 | Gendler | 425/391 |
| 1,997,360 | 4/1935 | Crozier | 198/839 |
| 2,784,834 | 3/1957 | Trinkle | 198/839 |
| 2,979,187 | 4/1961 | Erickson | 198/839 |
| 3,139,970 | 7/1964 | Mordstein | 198/839 |
| 3,920,370 | 11/1975 | Miller | 425/363 |
| 4,992,285 | 2/1991 | Larsen | 426/502 |

FOREIGN PATENT DOCUMENTS 1401960 5/1965 France ............................. 198/839

*Primary Examiner*—Jill L. Heitbrink
*Attorney, Agent, or Firm*—Vogt & O'Donnell

[57] ABSTRACT

Rolled products are prepared by transporting articles from an upstream end to a downstream end of an endless conveyor belt upper run having a complete spiral twist therein for shaping the articles so that rolled products emerge from the twist on the upper run.

22 Claims, 1 Drawing Sheet

METHOD AND APPARATUS FOR PREPARATION OF ROLLED PRODUCTS

BACKGROUND OF THE INVENTION

The present invention relates to a machine and method for rolling articles, more especially articles of food, for preparing rolled products.

SUMMARY OF THE INVENTION

According to the present invention, there is provided a rolling machine which comprises an endless conveyor belt trained about end rollers characterised in that the upper run of the conveyor belt is formed with one complete spiral twist.

The present invention provides a process for rolling an article which comprises placing the article on the upper run of an endless conveyor belt at the upstream end and transporting the article to the downstream end characterized in that the upper run of the conveyor belt is formed with one complete spiral twist so that the article passes through the spiral twist and is shaped in the twist so that a rolled product emerges from the twist on the upper run.

DESCRIPTION OF PREFERRED EMBODIMENTS

The position of the starting-point of the twist on the upper run of the conveyor belt may be controlled by a roller positioned below and contacting the upper run of the conveyor belt. The position of the end-point of the twist on the upper run may be controlled by an adjustable wheel pressing down on the upper surface of the upper run of the conveyor belt which also prevents the twist travelling around the downstream end roller. The adjustable wheel is preferably positioned adjacent a side edge of the upper surface so that it does not interfere with the rolled product. The wheel may be adjustable forwards, backwards or sideways.

Desirably, the lower run of the conveyor belt is also formed with one complete spiral twist in order to reorient the belt. The position of the end point of the twist on the lower run may be controlled by a pair of rollers pinching the upper and lower surfaces of the lower run. These rollers also prevent the twist on the lower run travelling around the upstream end roller.

Advantageously, movable rings are provided on either side of the end rollers which not only serve to retain the twisted belt in a fixed place but also enable the shape of the twist on the belt to be adjusted in order to optimise the rolling facility.

Preferably, a second endless conveyor belt trained about end rollers is provided inside the endless conveyor belt formed with the spiral twist. This second belt provides a moving base for the conveyor belt formed with the spiral twist and preferably provides a non-frictional surface. In this two belt embodiment, as is illustrated in the drawing figures, the roller for controlling the starting point of the twist is positioned below the second belt for effecting the control of the starting point of the twist of the first endless conveyor belt.

Advantageously, the non-driving end rollers of the two belts are adjustable.

The article processed should be flexible, and the process of the invention is particularly suitable for rolling articles of food such as meat, cannelloni, crepes, pancakes, cooked cabbage leaves, etc. The food product may be filled for instance by feeding a filling onto the article of food before it is transported through the spiral twist on the belt. Examples of filled products are paupiette and crepes and cooked cabbage leaves filled with minced meat.

The present invention is illustrated by way of Example only with reference to the accompanying drawings.

DETAILED DESCRIPTION OF THE DRAWINGS

Figure 1:
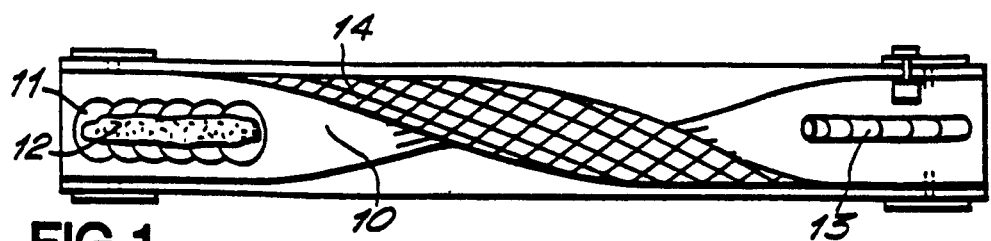
FIG. 1 is a top diagrammatic view of a conveyor belt according to this invention.
Figure 2:
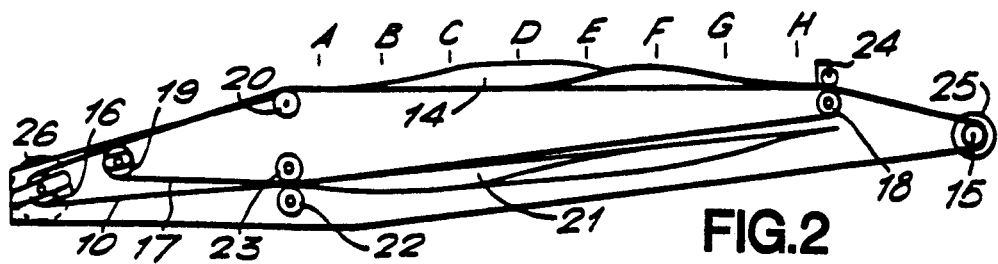
FIG. 2 is a sectional side view of the machine in more detail.

Each of FIGS. 1 and 2 illustrate an upper run of an endless conveyor belt 10 which has a spiral twist 14 therein. Hatching in the FIG. 1 drawing illustrates the lower surface of belt 10. In each of FIGS. 1 and 3, articles 11, such as slices of meat in FIG. 1, and filling 12 are illustrated at an upstream end of the upper run, and rolled product 13 shaped by twist 14 is shown at a downstream end of the upper run.

Figure 3:
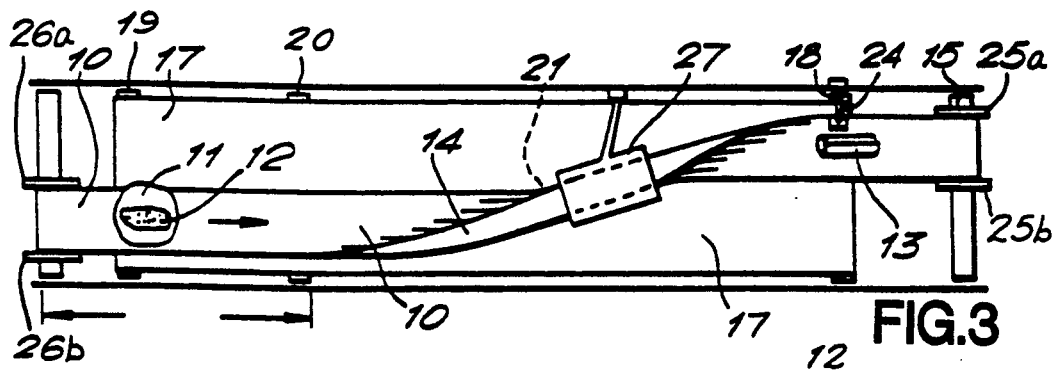
FIG. 3 is a top plan view of the machine of FIG. 2.

As shown in FIG. 3, belt 10, which is sufficiently plastic to have the spiral twist formed therein, is trained about rollers 15 and 16 which have a longitudinal extent greater than a width of belt 10. As also illustrated in FIG. 3, pairs of movable rings 25a and 25b and 26a and 26b are positioned, respectively, on rollers 15 and 16, so that belt 10 is positioned between each pair of rings, the rings being movable for moving a positioning of the rings and belt with respect to the longitudinal extent of the rollers to adjust the shape of twist 14 and to optimize the rolling facility.

FIGS. 2 and 3 also illustrate a second belt 17 of conventional material trained around rollers 18, 19. As is illustrated, the second set of rollers 18, 19 and second conveyor belt 17 are positioned for providing a second conveyor upper run beneath and parallel to the first conveyor upper run and for providing a moving base for the first conveyor upper run. A roller 20 is positioned below the upper run of second belt 17 and hence, below the upper run of first belt 10 to prevent the twist 14 starting before the position of roller 20. As also illustrated in FIG. 2, the first belt 10 is formed with a second twist 21 on the lower run to reorient it, and lightly contacting rollers 22, 23 pinch the lower run to keep it flat and prevent the twist travelling around the end roller 16.

As also illustrated in FIGS. 2 and 3, to prevent twist 14 from travelling around the drive roller 15, there is provided a small adjustable wheel 24 which presses against the upper surface of the belt 10. As further illustrated in FIG. 3, guide or support 27 is positioned adjacent the twist to prevent expansion of the spiral twist.

The second belt 17 creates a moving base for the first belt 10 to prevent spillage of the products from belt 10 from causing problems. The drive roller 18 for the second belt is connected to the drive roller 15 for the first belt 10 by means of a chain (not shown) to a driving unit (not shown). The drive rollers 15, 18 are fixed and have the same speed. The end rollers 16, 19 are adjustable forwards and backwards to adjust the belts 10, 17.

Each of FIGS. 4–11 shows a section view corresponding to sections A–H in FIG. 2 through the food product with filling being rolled.

Figure 4:
FIGS. 4–11 show step by step how the article of food rolls up around the filling.
Figure 5:
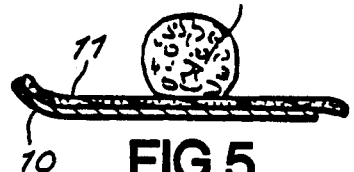
Figure 6:
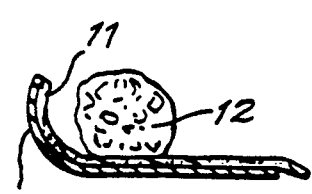
Figure 7:
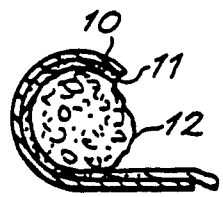
Figure 8:
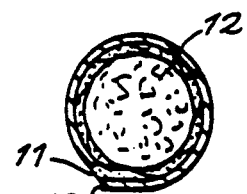
Figure 9:
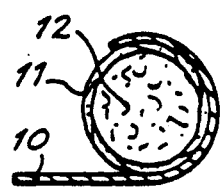
Figure 10:
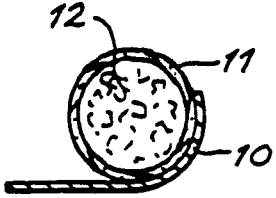
Figure 11:

In FIG. 4, a cover article 11, which has a planar form, and filling 12 are illustrated as being positioned on belt 10. FIG. 5 illustrates the beginning of twist 14 at one side of belt 10, and FIG. 6 illustrates article 11 following the belt. FIG. 7 illustrates the belt shaping article 11 to further surround the filling, and when the twist is complete, as illustrated in FIG. 8, article 11 is shaped and rolled about filling 12 to form the rolled product. FIGS. 9 and 10 illustrate the belt returning to the orientation of FIG. 4, which continues until the belt assumes the FIG. 4 orientation, as illustrated in FIG. 11 which also shows rolled product 13 which then is ready for further operations, e.g., packaging, cooking, freezing, cutting and so forth.

I claim:

1. A process for preparing rolled products comprising placing and transporting an article on an endless conveyor belt upper run having a complete spiral twist therein between an upper run upstream end and an upper run downstream end and shaping the transported article in the twist so that a rolled product emerges from the twist on the upper run.

2. A process according to claim 1 further comprising controlling an end point of the twist.

3. A process according to claim 1 further comprising controlling a starting point of the twist.

4. A process according to claim 1 further comprising controlling a starting point of the twist and controlling an end point of the twist.

5. A process according to claim 1 further comprising preventing expansion of the twist.

6. A process according to claim 1 wherein a lower run of the belt has a twist and further comprising controlling an end point of the lower run twist to prevent the lower run twist from travelling to the upper run.

7. A process according to claim 1 wherein the conveyor belt provides a first belt and further comprising moving an upper run of a second belt beneath the upper run of the first belt for providing a moving base for the upper run of the first belt.

8. A process according to claim 1 wherein the article is a food article.

9. A process according to claim 8 further comprising, prior to shaping the rolled product in the twist, feeding a filling material onto the food article.

10. A process according to claim 8 wherein the food article has a planar form.

11. A conveyor apparatus for preparing formed rolled articles comprising:

two rollers and an endless conveyor belt which is trained about the rollers so that the belt has an upper run having a complete spiral twist formed therein and wherein the rollers have a longitudinal extent greater than a width of the belt; and a pair of rings movably positioned on each roller so that the width of the belt is positioned between each pair of rings and so that the rings are movable for adjusting a position of the belt with respect to the longitudinal extent of the rollers.

12. An apparatus according to claim 11 further comprising a wheel which is positioned on an upper surface of the upper run for adjusting and controlling an end point of the twist.

13. An apparatus according to claim 12 wherein the wheel is positioned adjacent an edge of the upper run surface.

14. An apparatus according to claim 11 further comprising a twist-positioning-roller positioned beneath the upper run of the belt for controlling a starting point of the upper run twist.

15. An apparatus according to claim 11 further comprising a wheel which is positioned on an upper surface of the upper run for adjusting and controlling an end point of the twist and further comprising a twist-positioning-roller positioned beneath the upper run of the belt for controlling a starting point of the upper run twist.

16. An apparatus according to claim 11 further comprising a support member positioned adjacent to the twist for preventing expansion of the twist.

17. An apparatus according to claim 11 wherein a lower run of the belt has a spiral twist formed therein.

18. An apparatus according to claim 17 further comprising a pair of pinching rollers positioned so that the lower run passes between the pinching rollers for controlling an end point of the lower run twist.

19. An apparatus according to claim 11 wherein the rollers and conveyor belt provide a first set of rollers and a first conveyor belt and further comprising a second set of rollers and a second endless conveyor belt trained about the second set of rollers being positioned for providing a second conveyor belt upper run beneath and parallel to the first conveyor belt upper run for providing a moving base for the first conveyor belt upper run.

20. An apparatus according to claim 19 further comprising a wheel which is positioned on an upper surface of the upper run for adjusting and controlling an end point of the first conveyor belt upper run twist and further comprising a twist-positioning-roller positioned beneath the second conveyor belt upper run for controlling a starting point of the first conveyor belt upper run twist.

21. An apparatus according to claim 19 further comprising a support member positioned adjacent the twist for preventing expansion of the twist.

22. An apparatus according to claim 20 further comprising a support member positioned adjacent the twist for preventing expansion of the twist.

* * * * *

UNITED STATES PATENT AND TRADEMARK OFFICE
CERTIFICATE OF CORRECTION

PATENT NO. : 5,330,776
DATED : July 19, 1994
INVENTOR(S) : John I. G. WIKSTROEM

It is certified that error appears in the above-indentified patent and that said Letters Patent is hereby corrected as shown below:

Column 2, line 20, "2" should be --3--.

Signed and Sealed this

Twenty-seventh Day of September, 1994

Attest:

BRUCE LEHMAN

*Attesting Officer*    *Commissioner of Patents and Trademarks*